No. 647,110. Patented Apr. 10, 1900.
J. G. OXNARD & W. BAUR.
PROCESS OF MAKING SUGAR.
(Application filed Apr. 26, 1897.)

(No Model.)

WITNESS
Chapman W. Fowler
Hyatt Norwood

INVENTORS
James G. Oxnard & Wilhelm Baur
BY
T. Wallis Fowler
their ATTORNEY

UNITED STATES PATENT OFFICE.

JAMES G. OXNARD AND WILHELM BAUR, OF NEW YORK, N. Y., ASSIGNORS TO THE OXNARD CONSTRUCTION COMPANY, OF WEST VIRGINIA.

PROCESS OF MAKING SUGAR.

SPECIFICATION forming part of Letters Patent No. 647,110, dated April 10, 1900.

Application filed April 26, 1897. Serial No. 634,003. (No specimens.)

*To all whom it may concern:*

Be it known that we, JAMES G. OXNARD, a citizen of the United States, and WILHELM BAUR, a subject of the Emperor of Germany, both residing at New York, in the county of New York and State of New York, have invented certain new and useful Improvements in Processes of Manufacturing Standard Granulated and Yellow Clarified Sugars from Sugar-Cane, of which the following is a specification, reference being had therein to the accompanying drawings.

Our invention relates to the manufacture of sugar, and has for its objects the manufacture of standard granulated and yellow clarified sugars from sugar-cane without making at any stage of the process an inferior or lower grade of sugar which has to be remelted.

Our invention comprehends the production of a granulated-sugar or first masse-cuite from clarified cane-juice, then separately collecting the first molasses (green syrup) and the clairce purged from this masse-cuite and clarifying and filtering the same, then combining the clarified and filtered clairce with fresh juice to form a granulated-sugar or first masse-cuite and adding the aforesaid first molasses to another portion of fresh juice to form a mixed strike, producing a masse-cuite of yellow clarified sugar, then agitating and cooling this second masse-cuite and adding thereto during the cooling process and in such quantities as will maintain the masse-cuite of substantially-uniform fluidity a final molasses obtained from a previous second masse-cuite of yellow clarified sugar, and then purging the masse-cuite and washing the same to yellow clarified sugar and separately collecting the final molasses and the clairce and clarifying the clairce and combining it with fresh juice and the first molasses purged from a granulated-sugar or first masse-cuite to produce another masse-cuite of yellow clarified sugar.

Our invention consists in the process which we will hereinafter describe and claim.

Figure 1:
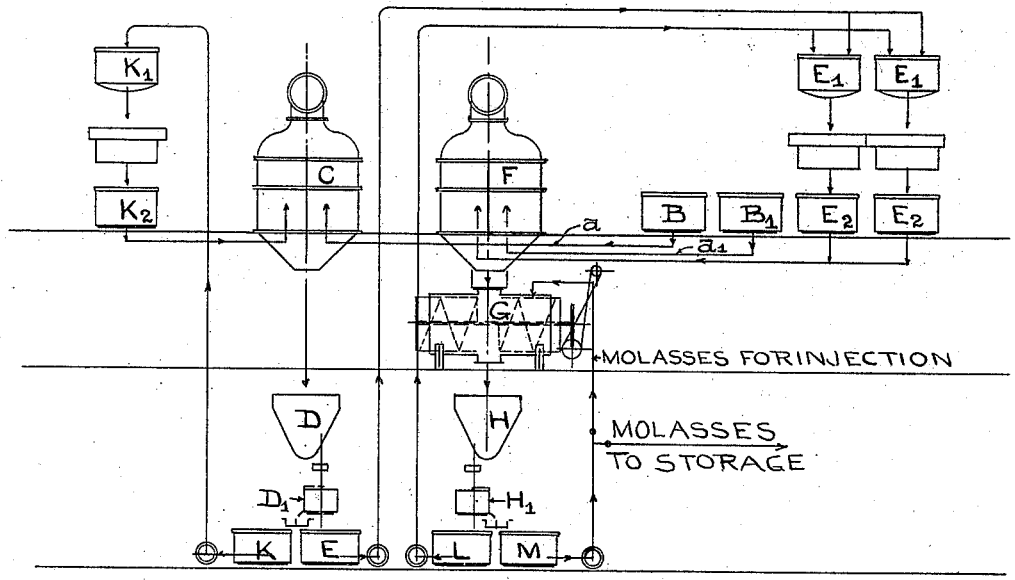
Figure 2:
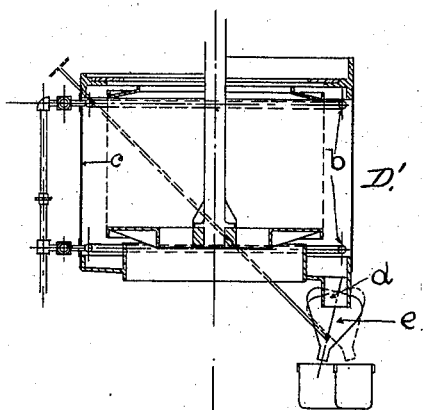
Figure 3:
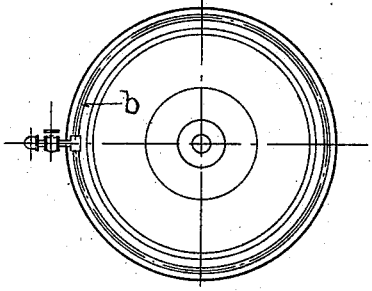

In the drawings hereto annexed, Figure 1 illustrates a diagrammatic figure of an apparatus by which our process may be carried out. Figs. 2 and 3 are vertical and horizontal sectional views of one of the centrifugals.

We will now describe our process in full, reference being had to the accompanying drawings.

The juice is extracted from the cane in the well-known manner and is clarified and treated as usual until it is ready to go to the vacuum-pan to be boiled for masse-cuite. This juice, which has been clarified and concentrated in the ordinary manner, is received into the tanks B B' as a thick clarified juice. A portion of this juice is then led by a pipe $a$ to the vacuum-pan C and boiled therein for a granulated-sugar masse-cuite. Another portion, that remaining in tank B', for instance, is reserved to be used at a subsequent stage, as will presently be indicated. The pan C we will hereinafter refer to as the "first" pan to distinguish it from the "second" pan F. The masse-cuite produced in the first pan C is discharged into an open mixer D, cooled by water or other means, and then spun off or purged in centrifugals D' in the ordinary manner. The detailed construction of these centrifugals is fully shown and described in another application, Serial No. 641,307, filed by us June 18, 1897. In this instance, however, the centrifugals D' (see Figs. 2 and 3) are provided with perforated coils $b$, which are arranged in such a manner that by means of steam or hot water forced through the coils and perforations the inner walls of the outer basket $c$, as well as the collecting-gutter $d$ at the bottom, are thoroughly washed and freed from the syrup adhering to them. The gutter $d$ has preferably a movable nozzle $e$ to enable the operator to direct the outflow of the various syrups coming from this centrifugal into different channels or gutters, the purpose of which arrangement will be manifest from the following: The masse-cuite is dropped from the mixer D into the centrifugal D', of which the inner wall of the outer basket has been washed, as just described, and the centrifugal is run until the molasses stops running from the masse-cuite. The first molasses or green syrup of the first masse-cuite is collected in tank E, diluted with water to the density of thick juice, clarified and filtered and is then ready to be boiled in the second pan F with that part of the thick juice reserved for that purpose and with that part of the separated clairce obtained from washing a second masse-cuite, as hereinafter mentioned. Before the steam or water is turned on in the coils $b$ the movable outlet or nozzle $e$ is turned to discharge into the second gutter or trough K to carry off the clairce alone of the first masse-cuite. After the sugar remaining in the centrifugal is washed to the desired standard and before the machine is stopped the water or steam should be turned on into the outer basket and the collecting-gutter thereof thoroughly cleansed to remove all particles of high-testing washed syrups. The clairce received into the troughs K is to be delivered by a pump, for instance, into the blow-ups K' and clarified and received into the tank K$^2$ and finally sent to the first pan, as before alluded to. The sugar remaining in the centrifugal will be the white sugar and is ready for the granulator. The first molasses, which has been purged from the masse-cuite of the first pan C by the centrifugal action of the machines, is collected in a tank or vessel E and after being diluted with water to about the density of the thick juice, clarified, and filtered in the usual manner is then ready to be boiled in the second pan F with that part of the thick fresh juice reserved for this purpose and also with the clairce obtained from washing a yellow clarified masse-cuite, as hereinafter disclosed. To further this operation, the tank B', containing the portion of the thick juice originally reserved, is connected with pan F by means of a pipe $a'$, and the first molasses in the tank or vessel E is pumped or otherwise delivered into the blow-ups E' and will be clarified, as usual, and delivered into storage-tanks E$^2$ and finally into the second vacuum-pan F with the aforesaid reserved thick juice and therein boiled. The mixture in the pan F, which is of a lower purity than that in the first pan, is boiled in this second vacuum-pan F for yellow clarified sugar masse-cuite, together with the clairce of a previous pan of the same kind, as we will presently disclose. The masse-cuite of this second vacuum-pan F is dropped into a closed vessel G, provided with a cooling-jacket and means for stirring the masse-cuite, and is left therein for about eighteen to thirty hours or more to enable it to be cooled to a temperature of between 90° and 100° Fahrenheit. During this process of cooling the masse-cuite will get gradually stiffer and more dense, which will increase the power necessary to do the work of stirring to a great extent. To avoid this and also to foster the moving of the individual crystals, we inject into this masse-cuite during the process of cooling and stirring molasses previously obtained, the amount of molasses added being in such quantities that the masse-cuite will remain always in about the same condition of fluidity as it was when leaving the pan at a higher temperature. The mass-cuite is then discharged into a centrifugal mixer H, of any suitable and well-known type, and spun off in centrifugals H'. The centrifugals H' are similar to those indicated by D' and are provided with perforated coils $b$, which are arranged in such a manner that by means of steam or hot water forced through the coils and perforations the inner walls of the outer basket $c$, as well as the collecting-gutter $d$, are thoroughly washed and freed from the syrup adhering to them. The gutter $d$ has also a movable nozzle $e$ to enable the operator to direct the outflow of the various syrups coming from this centrifugal into different channels or gutters, the purpose of which arrangement will be manifest from the following: The masse-cuite is dropped from the mixer H into the centrifugal H', of which the inner wall of the outer basket and gutter has been washed, as just described, and the centrifugal is run until the molasses stops running from the masse-cuite. If the masse-cuite from the second pan has been treated as above described, it will be found that the molasses resulting from the treatment is of molasses purity and all the sugar extracted from the masse-cuite is a standard quality of yellow clarified sugar, without making at any stage of the process another or inferior kind of sugar which has to be remelted. In other words, all the juices and syrups will be boiled into a masse-cuite, which will produce a granulated and yellow clarified sugar and final molasses without the necessity of boiling any of the sugar solution to any lower grade of sugar, so that the only product made by our process is a standard-quality granulated and yellow clarified sugar and molasses. Before the steam or water is turned on in the coils $b$ the movable outlet of nozzle $e$ may be turned to discharge into a second gutter or trough L to carry off the clairce alone. After the sugar remaining in the centrifugal is washed to the desired standard and before the machine is stopped the water or steam should be turned on in the outer basket and the collecting-gutter thereof thoroughly cleansed to remove all particles of high-testing clairce. The clairce received into the troughs L is to be delivered—by a pump, for instance—into the blow-ups E' and clarified and received into the tanks E$^2$ and finally sent to the second pan to be therein boiled with a retained portion of the clarified thick juice and the first molasses (green syrup) purged from the granulated-sugar masse-cuite before alluded to. By this means we recover all of the sugar from the juice and utilize it to produce granulated and yellow clarified sugar, and we do this without making at any period of the process any grade of sugar inferior to or lower than standard yellow sugar or which requires remelting.

Having thus described our invention, what we claim as new, and desire to secure by Letters Patent, is—

1. The process herein described of manufacturing granulated and yellow clarified sugar from cane-juice which consists, essentially, in producing a granulated-sugar or first masse-cuite from clarified cane-juice; then separately collecting the first molasses (green syrup) and the clairce obtained from washing the masse-cuite and clarifying the same; then combining the clarified clairce with fresh juice to form a granulated-sugar or first masse-cuite, and adding the said first molasses to another portion of fresh juice to form a mixed strike producing a second masse-cuite; then agitating and cooling this masse-cuite and adding thereto during the cooling process, and in such quantities as will maintain the masse-cuite of substantially-uniform fluidity, a final molasses obtained from a previous second masse-cuite; then purging the masse-cuite and washing the same to yellow sugar, and separately collecting the final molasses and the clairce and clarifying the said clairce and combining it with fresh juice and the first molasses purged from a granulated-sugar or first masse-cuite to produce a second masse-cuite.

2. The process herein described of manufacturing granulated and yellow clarified sugar from cane-juice, which consists, essentially, in producing a granulated-sugar or first masse-cuite from clarified cane-juice and separately collecting the first molasses (green syrup) and the clairce obtained from washing the masse-cuite and clarifying the same; then combining the clarified clairce with fresh juice to form a granulated-sugar or first masse-cuite and combining the said first molasses to another portion of fresh juice to form a mixed strike producing a second masse-cuite; then purging this masse-cuite and washing the same to yellow sugar and separately collecting the final molasses and the clairce, and clarifying said clairce and combining it with fresh juice and the first molasses purged from a granulated-sugar or first masse-cuite to make a second masse-cuite producing clarified yellow sugar.

In testimony whereof we affix our signatures in presence of two witnesses.

JAMES G. OXNARD.
WILHELM BAUR.

Witnesses as to James G. Oxnard:
  GEO. E. TERRY,
  T. W. FOWLER.
Witnesses as to Wilhelm Baur:
  S. D. SCHENCK,
  O. G. HAMILTON.